US012809284B2

(12) United States Patent
Niwayama et al.

(10) Patent No.: US 12,809,284 B2
(45) Date of Patent: Nov. 24, 2026

(54) TONER, TONER ACCOMMODATING UNIT, IMAGE FORMING APPARATUS, AND IMAGE FORMING METHOD

(71) Applicants: Kei Niwayama, Shizuoka (JP); Masayuki Ishii, Shizuoka (JP)

(72) Inventors: Kei Niwayama, Shizuoka (JP); Masayuki Ishii, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 517 days.

(21) Appl. No.: 18/323,377

(22) Filed: May 24, 2023

(65) Prior Publication Data

US 2023/0384704 A1 Nov. 30, 2023

(30) Foreign Application Priority Data

May 26, 2022 (JP) ................................ 2022-086080

(51) Int. Cl.

*G03G 9/097* (2006.01)
*G03G 9/08* (2006.01)
*G03G 15/08* (2006.01)

(52) U.S. Cl.

CPC ....... *G03G 9/09775* (2013.01); *G03G 9/0819* (2013.01); *G03G 15/0865* (2013.01)

(58) Field of Classification Search

CPC ....................... G03G 9/09708; G03G 9/09725
See application file for complete search history.

(56) References Cited

U.S. PATENT DOCUMENTS 6,416,914 B1 7/2002 Nakamura et al.
2005/0277044 A1 12/2005 Watanabe et al.
2006/0269860 A1 11/2006 Nanya et al.
2008/0241728 A1* 10/2008 Mang .................. G03G 9/0904 430/111.1
2010/0081075 A1 4/2010 Watanabe et al.
2010/0196817 A1* 8/2010 Sasaki .................... G03G 15/08 525/437
2016/0319077 A1 11/2016 Ishizu et al.
2018/0259864 A1* 9/2018 Suzuki ................ G03G 9/0806
2020/0026208 A1 1/2020 Terui et al.
2020/0285168 A1 9/2020 Ishii et al.
2020/0319571 A1 10/2020 Takeuchi et al.
2021/0026267 A1 1/2021 Hanatani et al.
(Continued)

FOREIGN PATENT DOCUMENTS

EP 1 143 303 10/2001
EP 3 095 805 11/2016
EP 3 674 806 * 7/2020 ............ G03G 9/097
(Continued)

OTHER PUBLICATIONS

Translation of JP 2020-132778.*
(Continued)

*Primary Examiner* — Peter L Vajda
(74) *Attorney, Agent, or Firm* — Grüneberg Global IP, PLLC

(57) ABSTRACT

A toner contains mother toner particles each containing a binder resin, a releasing agent, and a charge control agent and an external additive containing hydrophobized polymethylsilsesquioxane particles with an average particle diameter of from 0.050 to 0.150 μm, wherein the mother toner particles have an average circularity of 0.95 or less.

20 Claims, 2 Drawing Sheets

(56) References Cited

U.S. PATENT DOCUMENTS

2021/0294238 A1 9/2021 Hashimoto et al.

FOREIGN PATENT DOCUMENTS

| | | | | | |
|---|---|---|---|---|---|
| JP | 62-67561 A | | 3/1987 | | |
| JP | 11-174731 | | 7/1999 | | |
| JP | 2005-060214 | | 3/2005 | | |
| JP | 2007-156099 | | 6/2007 | | |
| JP | 2008-15248 | | 1/2008 | | |
| JP | 2014-077930 | | 5/2014 | | |
| JP | 2016-128140 | | 7/2016 | | |
| JP | 2016-170345 | * | 9/2016 | ............. | G03G 9/087 |
| JP | 2020-29547 | | 2/2020 | | |
| JP | 2020-109500 A | | 7/2020 | | |
| JP | 2020-132778 | * | 8/2020 | ............. | C08G 77/08 |
| JP | 2021-036339 | | 3/2021 | | |
| JP | 2021-148845 A | | 9/2021 | | |
| WO | WO2015/107961 A1 | | 7/2015 | | |
| WO | WO2018/003749 A1 | | 1/2018 | | |

OTHER PUBLICATIONS

Translation of JP 2016-170345.*
Extended Search Report received for European Patent Application No. 23175066.2, mailed on Sep. 28, 2023, 8 pages.
U.S. Appl. No. 18/101,119, filed Jan. 25, 2023, Ayaka Mori, et al.
U.S. Appl. No. 18/081,701, filed Dec. 15, 2022, Yoshitaka Yamauchi, et al.
U.S. Appl. No. 18/086,687, filed Dec. 22, 2022, Kohtaroh Ogino, et al.
Office Action received for Japanese Patent Application No. 2022-086080, mailed on Nov. 25, 2025, 5 pages with English translation.
Office Action received for U.S. Appl. No. 18/664,523, mailed Aug. 4, 2026, 18 pages.
U.S. Appl. No. 18/664,523, filed May 15, 2024.

* cited by examiner

TONER, TONER ACCOMMODATING UNIT, IMAGE FORMING APPARATUS, AND IMAGE FORMING METHOD

CROSS-REFERENCE TO RELATED APPLICATIONS

This patent application is based on and claims priority pursuant to 35 U.S.C. § 119 to Japanese Patent Application No. 2022-086080, filed on May 26, 2022, in the Japan Patent Office, the entire disclosure of which is hereby incorporated by reference herein.

BACKGROUND

Technical Field

The present disclosure relates to a toner, a toner accommodating unit, an image forming apparatus, and an image forming method.

Description of the Related Art

Using an external additive with an average primary particle diameter of several to several tens nm is well known to impart fluidity and charging property to a toner for use in electrophotography. Demand for a toner that can fix at low temperatures increases in accordance with the diversification of the usage purposes of an image forming apparatus, the improvement of its performance, and the achievement of higher quality.

To use a toner material specialized for low temperature fixing, coating the toner material densely with an external additive or using an external additive with a large particle diameter is reported to be effective to impart a suitable storage stability.

However, since a typical external additive with a large particle diameter has a large true specific gravity, it is likely to detach from the toner's surface due to the mechanical strength in a developing device. This detached external additive transfers to a carrier or an image bearer, causing a negative impact.

SUMMARY

According to embodiments of the present disclosure, a toner is provided which contains mother toner particles each containing a binder resin, a releasing agent, and a charge control agent and an external additive containing hydrophobized polymethylsilsesquioxane particles with an average particle diameter of from 0.050 to 0.150 μm, wherein the mother toner particles have an average circularity of 0.95 or less.

As another aspect of embodiments of the present disclosure, a toner accommodating unit is provided which contains the toner mentioned above.

As another aspect of embodiments of the present disclosure, an image forming apparatus is provided which includes a latent electrostatic image bearer, a latent electrostatic image forming device for forming a latent electrostatic image on the latent electrostatic image bearer, a developing device for developing the latent electrostatic image formed on the latent electrostatic image bearer with the toner mentioned above to obtain a visible image, a transfer device for transferring the visible image onto a transfer medium, and a fixing device for fixing the visible image transferred to the transfer medium.

As another aspect of embodiments of the present disclosure, an image forming method is provided which includes forming a latent electrostatic image on a latent electrostatic image bearer, developing the latent electrostatic image formed on the latent electrostatic image bearer with the toner mentioned above to obtain a visible image, transferring the visible image formed on the latent electrostatic image bearer to a transfer medium, and fixing the visible image on the transfer medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
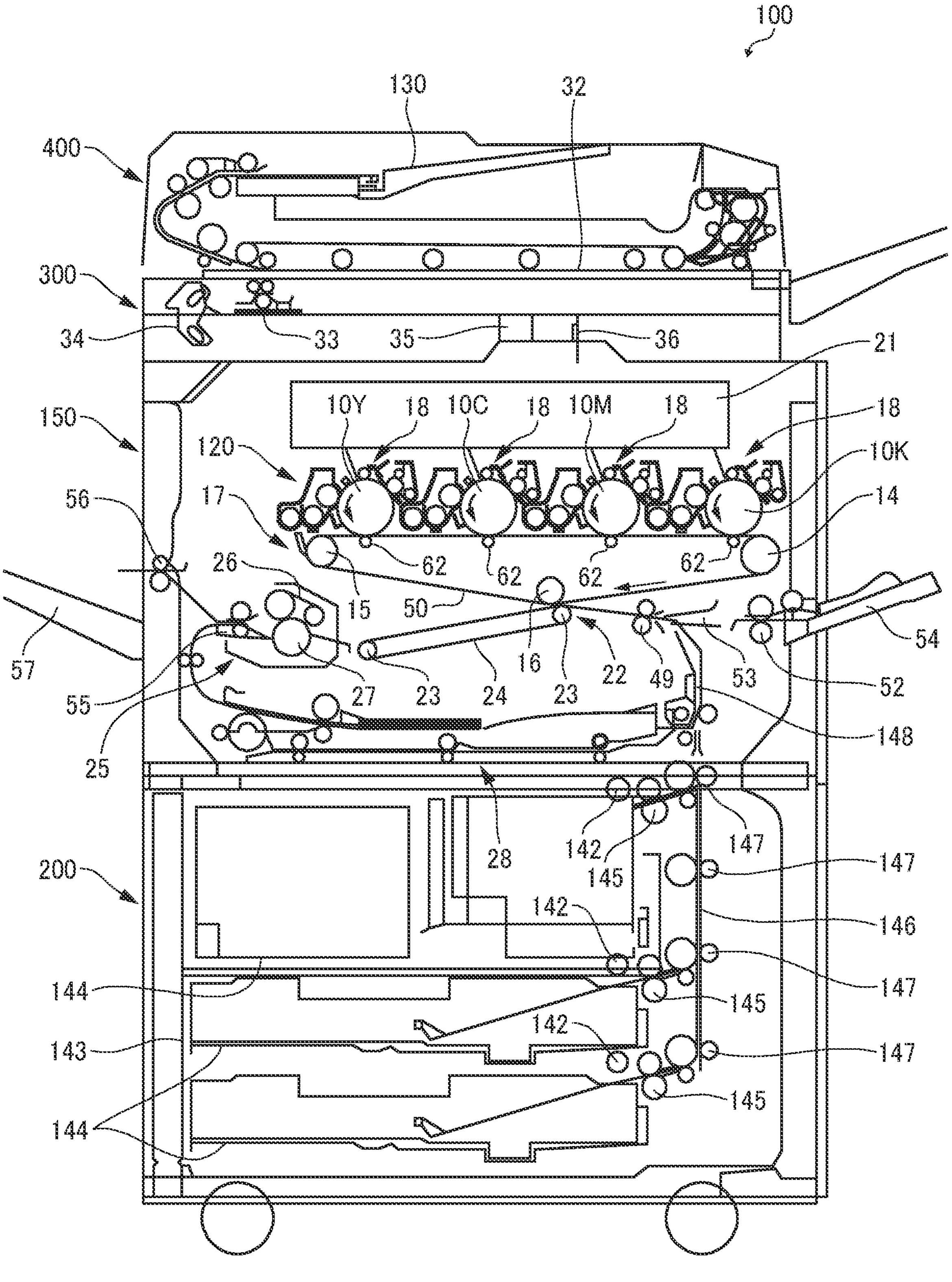
FIG. 1 is a schematic diagram illustrating an image forming apparatus employing a tandem system according to an embodiment of the present invention.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a toner is provided which strikes a balance between high temperature storage stability and low temperature fixability and with which quality images are produced over a long period of time.

The terms of image forming, recording, and printing in the present disclosure represent the same meaning.

Also, recording media, media, and print substrates in the present disclosure have the same meaning unless otherwise specified.

Toner

The toner of the present disclosure contains mother toner particles each containing a binder resin, a releasing agent, and a charge control agent, an external additive, and other optional components.

The mother toner particle has an average circularity of 0.95 or less. The external additive contains a hydrophobized polymethylsilsesquioxane particle whose average particle diameter of from 0.050 to 0.150 μm.

The toner may be referred to as "electrophotographic toner".

The inventors of the present invention made an investigation about typical toners and found out the toners involve problems derived from the typical technology.

One of the problems is the detachment of an external additive from a toner particle, which is that, for a typical toner containing an external additive particle with a large particle diameter of 50 nm or greater, the external additive particle readily detaches from the toner particle due to its size and shape, which may inhibit the release and receiving of charges between the toner and a carrier when the external additive attaches to the carrier, so that increasing the amount of the external additive attached to the toner is inappropriate even though the large external additive contributes to enhancing the storage stability of the toner. There is another problem of degrading the flowability of a toner containing a large external additive because of the size of the large external additive.

To solve these problems, the inventors of the present invention have formulated a toner. The toner contains mother toner particles each containing a binder resin, a releasing agent, and a charge control agent, and an external additive that contains polymethylsilsesquioxane with an average particle diameter of from 0.050 to 0.150 μm, wherein the mother toner particle has an average circularity of 0.95 or less. This toner demonstrates good flowability, striking a balance between high temperature storage stability and low temperature fixability. By using this toner, quality images can be produced for a long period of time.

Mother Toner Particle

The mother toner particle (hereinafter also referred to as mother toner or mother particle) contains a binder resin, a releasing agent, and a charge control agent. The mother toner particle preferably contains a colorant and optionally contains other components.

Average Circularity of Mother Toner Particle

The mother toner preferable has an average circularity of 0.95 or less and preferably from 0.890 to 0.945.

When mother toner particles with an average circularity of 0.95 or less are used for a system employing blade cleaning, it is possible to prevent producing foul images due to poor cleaning performance for an image bearer or transfer belt.

Poor cleaning performance does not cause a problem for printing or transferring an image with a low printing area ratio because residual toner remaining after transfer is little. However, when an image with a high printing area ratio, such as a color photo image, is produced or a non-transferred image is formed due to a defect relating to paper feeding or other processes, some of the toner used for printing may remain on a charged member such as an image bearer. If this remaining toner accumulates, background fouling may occur to an image produced.

In addition, the remaining toner contaminates a charging roller for charging a member subjected to charging such as an image bearer in a contact manner. As a result, the charging roller may fail to demonstrate its original charging ability.

A mother toner particle with an average circularity of 0.95 or less prevents such drawbacks.

The average circularity of the mother toner particle can be measured with a measuring device such as a flow type particle image analyzer (FPIA-3000, manufactured by SYSMEX CORPORATION).

The specific procedure for obtaining the average circularity is as follows: (1) A surfactant as a dispersion agent, preferably 0.1 to 5 ml of an alkylbenzenesulfonic acid salt, is added to 100 to 150 ml of water from which solid impurities have been preliminarily removed; (2) about 0.1 to about 0.5 g of a mother toner particle as a sample to be measured is added to the mixture prepared in (1); (3) the liquid suspension in which the mother toner particle is dispersed is subjected to an ultrasonic dispersion treatment for 1 to 3 minutes such that the concentration of the particles is 3,000 to 10,000 particles per microlitter; and (4) the shape of the mother toner particles are measured to obtain their circularity with the device mentioned above.

Binder Resin

The binder resin is not particularly limited and can be suitably selected to suit to a particular application.

Specific examples include, but are not limited to, styrene, styrene-based resins (homopolymers or copolymers of styrene or styrene substitute) such as poly-α-styrene, styrene-chlorostyrene copolymers, styrene-propylene copolymers, styrene-butadiene copolymers, styrene-vinyl chloride copolymers, styrene-vinyl acetate copolymer, styrene-maleic acid copolymer, styrene-acrylic acid ester copolymer, styrene-methacrylic acid ester copolymer, styrene-α-chloro-acrylic acid methyl copolymer, and styrene-acrylonitrile-acrylic acid-ester copolymers, epoxy resins, vinyl chloride resins, rosin-modified maleic acid resins, phenol resins, polyethylene resins, polypropylene resins, petroleum resins, polyurethane resins, ketone resins, ethylene-ethyl acrylate copolymers, xylene resins, and polyvinyl butyrate resins. These can be used alone or in combination.

Of these, polyester resins are preferable to achieve good low temperature fixing while keeping stability in a high temperature and humidity environment.

The method of manufacturing the binder resin mentioned above is not particularly limited and can be suitably selected to suit to a particular application. It includes bulk polymerization, solution polymerization, emulsion polymerization, and suspension polymerization.

Polyester Resin

The polyester resin is not particularly limited and can be suitably selected to suit to a particular application. It includes a crystalline resin, an amorphous resin, and a modified polyester resin. These can be used alone or in combination. Of these, an amorphous polyester reaction is preferable obtained by reacting polyol with polycarboxylic acid.

Specific examples of the polyol include, but are not limited to, diols, and tri- or higher polyols.

Specific examples of diol includes, but are not limited to, glycols such as ethylene glycol, diethylene glycol, propylene glycol, triethylene glycol, and propylene glycol, etherified bisphenols such as 1,4-bis(hydroxymeth)cyclohexane and bisdphenol A, an adduct of bisphenol A with alkylene (having two or three carbon atoms) oxide (average adduction mol number of from 1 to 10) such as polyoxypropylene (2,2)-2,2-bis(4-hydroxyphenyl)propane, polyoxyethylene(2,2)-2,2-bis(4-hydroxyphenyl)propane, hydrogenated bisphenol A, and an adduct of hydrogenated bisphenol A with an alkylene (having two or three carbon atoms) oxide (average adduction mol number of from 1 to 10).

Specific examples of tri- or higher alcohol include, but are not limited to, glycerin, pentaerythritol, and trimethylol propane.

These can be used alone or in combination.

Specific examples of the polycarboxylic acid include, but are not limited to, dicarboxylic acids and tri- or higher polycarboxylic acids.

Specific examples of dicarboxylic acid include, but are not limited to, adipic acid, phthalic acid, isophthalic acid, terephthalic acid, fumaric acid, maleic acid, succinic acid, and succinic acid substituted with an alkyl group with 1 to 20 carbon atoms or alkenyl group with 2 to 20 carbon atoms such as dodecenyl succinic acid and octyl succinic acid.

Specific examples of the tri- or higher carboxylic acid include, 1,2,4-benzene tricarboxylic acid (trimellitic acid), 1,2,5-benzene tricarboxylic acid, 1,2,4-cyclohexane tricarboxylic acid, 1,2,4-naphthalene tricarboxylic acid, 1,2,5-hexane tricarboxylic acid, 1,3-dicarboxyl-2-methylene carboxy propane, 1,2,7,8-octane tetracarboxylic acid, and their anhydrides.

These may be used alone or in a combination of two or more thereof.

The molecular weight of the polyester resin is not particularly limited and can be suitably selected to suit to a particular application. It is preferably within the following range. The weight average molecular weight (Mw) of the polyester resin is preferably from 10,000 to 100,000 and more preferably from 30,000 to 50,000.

The peak top molecular weight of the polyester resin is preferably from 10,000 to 60,000 and more preferably from 10,000 to 16,000.

The molecular weight can be measured with a gel permeation chromatography (GPC).

The glass transition temperature (Tg) of the polyester resin is preferably from 50 to 75 degrees C. and more preferably from 60 to 72 degrees C.

A Tg of 50 degrees C. or higher enhances the toner's high temperature storage stability and durability to stress such as agitation in a developing device.

In addition, toners with a Tg of 75 degrees C. or lower suitably deform when heated or pressured in fixing the toners, enhancing the low temperature fixability.

The proportion of the polyester resin is not particularly limited and can be suitably selected to suit to a particular application. The number of parts of the polyester resin is preferably from 50 to 95 parts by mass and more preferably from 60 to 90 parts by mass to 100 parts by mass of the mother toner particle mentioned above.

The colorant and the releasing agent are suitably dispersed in a toner at 50 parts by mass or greater or the polyester resin, reducing fogging and disturbance of an image obtained with the toner. A proportion of the polyester resin of 95 parts by mass or less is advantageous to producing high quality images and demonstrating excellent low temperature fixability.

Releasing Agent

The releasing is not particularly limited and can be suitably selected to suit to a particular application. Any known releasing agent including natural wax and synthetic wax can be suitably used.

These can be used alone or in combination.

Specific examples of natural waxes include, but are not limited to, plant waxes such as carnauba wax, cotton wax, vegetable wax, and rice wax; animal waxes such as bee wax and lanolin; mineral waxes such as ozokerite; and petroleum waxes such as paraffin, microcrystalline, and petrolatum.

Specific examples of synthetic waxes include, but are not limited to, synthetic hydrocarbon waxes such as Fisher Tropsch wax, polyethylene, and polypropylene, aliphatic acid amide ester, ketone, and ether, 12-hydroxystearic acid amide, stearic acid amide, phthalic acid anhydride imide, and chlorinated hydrocarbons; crystalline polymer resins having a low molecular weight such as homo polymers, for example, poly-n-stearylic methacrylate and poly-n-lauryl methacrylate, and copolymers (for example, copolymers of n-stearyl acrylate-ethylmethacrylate); and crystalline polymer having a long alkyl group in the branched chain are also usable.

Of these, carnauba wax, montan wax, and oxidized rice wax are preferable.

These may be used alone or in a combination of two or more thereof. Preferably, carnauba wax is fine-crystalline with an acid value of 5 or less and a particle diameter of 1 μm or less.

Montan wax generally refers to montan-based wax refined from a mineral and is preferably fine-crystal with an acid value of from 5 to 14.

Oxidized rice wax is produced by subjecting rice bran wax to oxidization in atmosphere. Its acid value is preferably from 10 to 30.

The proportion the releasing agent is not particularly limited and can be suitably selected to suit to a particular application. The number of parts of the releasing agent is preferably from 1 to 20 parts by mass and more preferably from 2 to 10 parts by mass to 100 parts of the toner.

A releasing agent at one or more parts by mass prevents hot offset resistance and low temperature fixability from lowering. A releasing agent at 20 or less parts by mass prevents high temperature storage stability from lowering and reduces the chance of fogging in an image obtained.

Charge Control Agent

The charge control agent is not particularly limited and can be suitably selected to suit to a particular application. Examples include, but are not limited to, nigrosine dye, metal complex dye (metal azo dye), and salicylic metal complex.

These can be used alone or in combination.

Of these, tri- or higher metal complex that can take a six coordination is preferable.

The metal includes, but is not limited to Al, Fe, Cr, and Zr.

Of these, a metal complex taking Fe as the center metal, which is free of toxicity, is preferable.

Specifically, azo iron dye represented by the following Chemical Structure 1 is preferable.

Chemical Structure 1

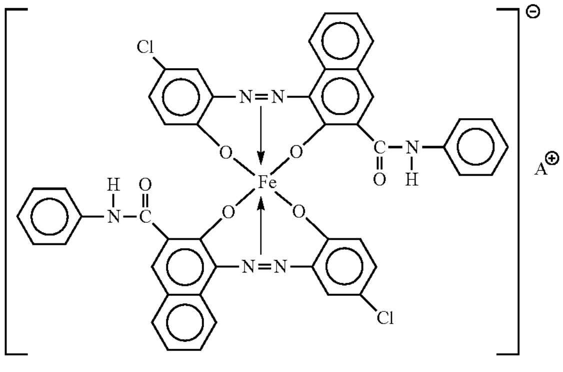

In the Chemical Structure 1, A+ represents an ammonium ion. The azo iron dye of the Chemical Structure 1 can be procured. One of the products is T-77, available from HODOGAYA CHEMICAL CO., LTD.

The amount of the charge control agent is preferably from 0.5 to 3.0 parts by mass and more preferably from 0.5 to 2.0 parts by mass to 100 parts by mass of the binder resin.

A charge control agent at 0.5 or more parts by mass demonstrates the features as charge control agent. A charge control agent at 3.0 or less parts by mass reduces chipping and cracking of toner particles, fixation on a blade, occurrence of filming, and deterioration of image quality caused by poor charging or supplying, and background fouling.

Coloring Material

The colorant is not particularly limited and can be suitably selected to suit to a particular application. Specific examples include, but are not limited to, carbon black, lamp black, iron black, aniline blue, phthalocyanine blue, phthalocyanine green, Hanza Yellow G, Rohdamine 6C Lake, Calco Oil Blue, Chrome Yellow, quinacridone, benzidine yellow, rose bengal, and triallyl methane-based dye.

These can be used alone or in combination.

The colorant can be used as black or full color toner.

The proportion of the colorant is not particularly limited and can be suitably selected to suit to a particular application. The number of parts of the colorant is preferably from 1 to 35 parts by mass and more preferably from 3 to 20 parts by mass to 100 parts by mass of the toner mentioned above.

External Additive

The external additive contains hydrophobized polymethylsilsesquioxane particles and other optional external additives.

Hydrophobized Polymethylsilsesquioxane Particle

Polymethylsilsesquioxane is a polymer of methyl trimethoxysilane.

This polymer is a silicone resin polymerized by cross-linking methyl trimethoxysilane in a three-dimensional network manner from a chemical structural point of view. The silicone resin is a spherical fine particle.

Therefore, polymethylsilsesquioxane is referred to as "a polymethylsilsesquioxane particle".

The hydrophobized polymethylsilsesquioxane particle can be obtained by subjecting polymethylsilsesquioxane particle to hydrophobization.

The polymethylsilsesquioxane particle has an average particle diameter of from 0.050 to 0.150 μm and preferably from 0.100 to 0.135 μm.

When the average particle diameter is greater than 0.150 μm, the polymethylsilsesquioxane particle rolls on and detaches from the toner's surface because the particle weakly attaches to the surface.

The average particle diameter of the polymethylsilsesquioxane particle can be measured utilizing a known method.

Specifically, the polymethylsilsesquioxane particle or a toner with the polymethylsilsesquiox particle externally attached thereto as an external additive is subjected to measuring with a scanning electron micriscope (SU8200 series, manufactured by Hitachi High-Technologies Corporation).

The external additive particles in an obtained image are recognized by binarization with an image processing software called "A-zou kun", created by Asahi Kasei Engineering Corporation. Then the circularity, equivalent circle diameter, and particle area of the particle are calculated.

The obtained values are determined as those derived from the circular areas. The equivalent circle diameter is obtained as the diameter calculated from the obtained values. The measuring sites are not particularly determined but three or more arbitrary fields are confirmed on a substrate where polymethylsilsesquioxane particles are dispersed in the case of measuring the polymethylsilsesquioxane particle or on toner's surface in the case of measuring the toner. The equivalent circle diameter is calculated for approximately 100 particles, followed by averaging to obtain the average particle diameter.

Method of Manufacturing Polymethylsilsesquioxane Particle

The polymethylsilsesquioxane particle can be manufactured by mixing and condensing a liquid hydlolyzate containing a hydlolyzate of methyl trimethoxysilane and an anionic surfactant with a precipitate containing water, a basic catalyst, and anionic surfactant.

Specific examples of the anionic surfactant include, but are not limited to, carboxylic acid-type anionic surfactants such as aliphatic monocarboxylates, polyoxyethylene alkyl ether carboxylates, and aliphatic acid oils; sulfonic acid-type anionic surfactants such as dialkyl sulfosuccinates, polyoxyethylene alkyl sulfosuccinates, alkanesulfonates, linear alkylbenzenesulfonates, branched alkylbenzenesulfonates, naphthalenesulfonate-formaldehyde condensates, and alkylnaphthalenesulfonates; sulfate ester-type anionic surfactants such as alkyl sulfates, polyoxyalkylene alkyl ether sulfates, and aliphatic acid sulfates; and phosphate ester-type anionic surfactants such as alkyl phosphates, alkyl phosphates, polyoxyethylene alkyl ether phosphates, and polyoxyethylene alkylaryl ether phosphates.

Of these, sulfonic acid-type anionic surfactants and sulfate ester-type anionic surfactants are preferable.

The liquid hydlolyzate preferably furthermore contains an acid catalyst such as an organic acid and an inorganic acid.

Specific examples of the organic acid include, but are not limited to, formic acid, acetic acid, propionic acid, oxalic acid, and citric acid.

Specific examples of the inorganic acid include, but are not limited to, hydrochloric acid, sulfuric acid, nitric acid, and phosphoric acid.

As condense reaction of silanol groups proceeds in mixing the liquid hydlolyzate and the precipitate, polymethylsilsesquioxane particles are formed.

The liquid dispersion of the polymethylsilsesquioxane particle obtained in this reaction is subjected to membrane separation, centrifugal and other methods to obtain polymethylsilsesquioxane particles.

The polymethylsilsesquioxane particles can be hydrophobized by surface-treating with hexamethyl disilazane (HMDS) or other substances in the liquid before separation.

The hydrophobized polymethylsilsesquioxane particle can be obtained by subjecting polymethylsilsesquioxane particles to hydrophobization with a hydrophobizing agent.

Examples of the hydrophobizing agent include, but are not limited to, known organic silicon compounds with an alkyl group (for example, a methyl group, an ethyl group, a propyl group, or a butyl group).

Specific examples include silazane compounds (for example, silane compounds such as methyltrimethoxysilane, dimethyldimethoxysilane, trimethylchlorosilane, and trimethylmethoxysilane, hexamethyldisilazane, and tetramethyldisilazane).

These may be used alone or in a combination of two or more thereof.

Of these, organic silicon compounds with a trimethyl group such as trimethylmethoxysilane and hexamethyldisilazane are preferable.

In addition, silicon oil treatment may be used.

This hydrophobizing prevents particles from agglomerating and enhances the dispersibility to mother toner.

In addition, the impact of severe environmental conditions such as high temperature and high humidity or low temperature and low humidity can be reduced, achieving stable image quality.

The proportion of the polymethylsilsesquioxane particle is preferably from 0.05 to 3 parts by mass to 100 parts by mass of the toner.

A proportion of 3 parts by mass or less reduces the occurrence of filming. A proportion of 0.05 parts by mass or greater can reduce fluctuation of flowability and chargeability over a long period of time, which leads to an advantage of achieving high image quality.

Other External Additive

The toner of the present disclosure contains at least polymethylsilsesquioxane particles. The toner may further contain other external additives and use two or more types.

The other external additives include, but are not limited to, flowable improvers and hydrophobizing treatment agents.

Specific examples of the flowable improvers include, but are not limited to, silicon oxide, titanium oxide, silicon carbide, aluminum oxide, barium titanate.

Of these, hydrophobized silica is particularly preferable.

Method of Manufacturing Toner

The toner can be manufactured by a known method including melt-kneading toner materials, pulverizing the melt-kneaded matter obtained, classifying the pulverized matter obtained to obtain mother toner particles, and externally-adding an external additive to the mother toner particle obtained.

In the melt-kneading, the toner material is mixed and charged in a melt-kneading machine for melt-kneading.

The melt-kneading machine includes, but is not limited to, a single or twin screw continuous melt-kneader and a batch-melt-kneader using a roll mill.

Specific examples include, but are not limited to, a KTK type twin screw extruder manufactured by Kobe Steel, Ltd., a TEM type extruder manufactured by Toshiba Machine Co., Ltd., a twin screw extruder manufactured by KCK Engineering, a PCM-type twin screw extruder, manufactured by Ikegai Corp., and a kokneader manufactured by Buss Ag.

Preferably, this melt-kneading is conducted under suitable conditions to avoid severing the molecular chain of a binder resin.

Specifically, the temperature in the melt-kneading is determined according to the softening point of the binder resin. When the temperature is too high relative to the softening point, the molecular chain is likely to be severely severed. When the temperature is too low relative to the softening point, dispersion may not proceed smoothly.

In the pulverizing, the melt-kneaded matter obtained in the melt-kneading is pulverized. In this pulverizing, the melt-kneaded matter is preferably subjected to coarse pulverizing, followed by fine pulverizing.

The melt-kneaded matter is pulverized by colliding with a collision board in a jet stream, colliding particles in a jet stream, or pulverizing at narrow gaps between a stator and a rotor that mechanically rotates.

In the classifying, the pulverized matter obtained in the pulverizing is classified and adjusted to have a predetermined particle diameter.

The pulverized matter can be classified by removing fine particles with a device such as a cyclone, a decanter, or a centrifugal.

After the pulverizing, the pulverized matter is classified in an air stream by centrifugal to manufacture mother toner particles with a predetermined particle diameter.

In the externally adding, an external additive is externally added to the mother toner particles obtained in the classifying.

The mother toner particle and external additive are mixed and stirred with a mixer. The mixer cracks the external additive and the cracked external additive covers the surface of the mother toner particle.

Developer

The developing agent relating to the present disclosure contains at least the toner and other suitably selected optional components such as carrier.

When the toner of the present disclosure is used as a developing agent, the toner can be used as a single-component developing agent or a mixture of the toner and carrier can be used as a two-component developing agent. There is no particular limitation to these developing agents. A two-component developing agent is preferable to enjoy a long working life when a developing agent is used in a higher performance printer capable of supporting the high information processing speed recently achieved.

When the developing agent is a two-component developing agent containing the toner of the present disclosure and carrier, the carrier can be magnetic carrier or non-magnetic carrier depending on the type of the two-component developing method employed.

Examples of the magnetic carrier include, but are not limited to, spinel ferrites such as magnetite and gamma ferric oxide, spinel ferrites containing one or two types of metals such as Mn, Ni, Zn, Mg, and Cu other than iron, magnetoplumbite type ferrites such as barium ferrite, and iron or alloyed metal particles with an oxidized layer on the surface.

The magnetic carrier can take particulate, spherical, or needle-like form.

Of these, if highly-magnetized carrier is used, using a strongly-magnetic fine particles such as iron particles is preferable. Spinel ferrites such as magnetite and gamma ferric oxide and magnetoplumbite type ferrites such as barium ferrite are preferable to demonstrate chemical stability.

Specific magnetoplumbite type ferrites include, but are not limited to, MFL-35S, MFL-35HS (both manufactured by Powdertech Co., Ltd.), DFC-400M, DFC-410M, and SM-350NV (all manufactured by DOWA IP Creation Co., Ltd.).

As the magnetic carrier, it is possible to use resin carrier containing magnetic fine particles such as strongly-magnetized fine particles desirably magnetized depending on its type and content.

Such resin carrier preferably has a magnetization of from 30 to 150 emu/g at 1,000 oersted.

The resin carrier can be manufactured by the following method of: spraying melt-kneaded matter of magnetized fine particles and an insulated binder resin with a spray drier; manufacturing resin carrier in which magnetized fine particles are dispersed in a condensed binder resin by allowing to react and cure monomers and prepolymers in an aqueous medium under the presence of magnetized fine particles; fixating positively or negatively-charged or conductive fine particles on a magnetic carrier's surface; coating a magnetic carrier's surface with resin; or coating a magnetic carrier's surface with resin containing positively or negatively-charged or conductive fine particles.

These methods adjust the chargeability of resin carrier.

The resin for coating includes, but is not limited to, a silicone resin, acrylic resin, epoxy resin, and fluorine-containing resin.

Of these, a silicone resin and an acrylic resin are preferable.

The proportion of the carrier in the two-component developing agent mentioned above is preferably from 85 to lower than 98 percent by mass.

A proportion of the carrier of 85 percent by mass or greater reduces the occurrence of a defective image caused by frequent scattering of toner from a developing device.

A proportion of the carrier of less than 98 percent by mass inhibits the amount of charge of a toner for electrophotographic developing from extremely increasing and the amount of the toner supplied from extremely decreasing, thereby effectively preventing decreasing the image density and producing defective images.

Toner Accommodating Unit

The toner accommodating unit in the present disclosure contains the toner of the present disclosure in a unit capable of accommodating the toner.

Examples of the toner accommodating unit are a toner accommodating container, a developing unit, and a process cartridge.

The toner accommodating container is a vessel containing the oner.

The developing unit accommodates the toner and develops an image with the toner.

The process cartridge integrally includes at least an image bearer and a developing device, accommodates the toner, and is detachably attachable to an image forming apparatus.

The process cartridge may further include at least one member selected from the group consisting of a charger, an exposure, and a cleaning device.

The toner accommodating unit of the present disclosure contains the toner of the present disclosure.

The toner accommodating unit of the present disclosure is mounted onto an image forming apparatus. The image forming apparatus forms images with the toner of the present disclosure so that the images obtained have excellent low temperature fixability and high temperature storage stability.

Image Forming Apparatus and Image Forming Method

The image forming apparatus of the present disclosure includes at least a latent electrostatic image bearer or photoreceptor, a latent electrostatic image forming device, a developing device, a transfer device, and a fixing device with other optional devices such as a cleaner, a discharging device, a recycling device, and a control device.

The image forming method of the present disclosure includes forming a latent electrostatic image on a latent electrostatic image bearer, developing the latent electrostatic image, transferring the developed image, fixing the transferred image, and optionally cleaning the latent electrostatic image bearer, discharging the latent electrostatic image bearer, recycling, and controlling.

The image forming apparatus of the present disclosure suitably executed the image forming method of the present disclosure. In the forming, the latent electrostatic image is formed with the latent electrostatic image forming device. The developing is conducted with the developing device. The transferring is conducted with the transfer device. The fixing is conducted with the fixing device. The other optional processes are conducted with the corresponding optional devices.

Forming Latent Electrostatic Image and Latent Electrostatic Image Forming Device In the forming a latent electrostatic image, a latent electrostatic image is formed on a latent electrostatic image bearer.

The latent electrostatic image forming device forms a latent electrostatic image on the latent electrostatic image bearer.

There is no specific limitation to the latent electrostatic image bearer (also referred to as electrophotographic insulator, photoconductor, or photoreceptor) with regard to factors such as material, form, structure, and size and a suitable latent electrostatic image bearer can be selected among known bearers. A latent electrostatic image bearer with a drum-like form is preferable. From a material point of view, an inorganic photoconductor made of amorphous silicone or selenium and an organic photoconductor (OPC) made of polysilane or phthalopolymethine are suitable.

Of these, a substance such as amorphous silicon is preferable to achieve a long working life.

One way of forming a latent electrostatic image is to uniformly charge the surface of the latent electrostatic image bearer and irradiate the surface according to the image information obtained using the latent electrostatic image forming device.

The latent electrostatic image forming device includes at least a charger that uniformly charges the surface of the image bearer and an irradiator that irradiates the surface of the image bearer according to the image information obtained.

The charging is conducted by, for example, applying a bias to the image bearer's surface with the charger.

The charger is not particularly limited and can be suitably selected to suit to a particular application.

Specific examples include, but are not limited to, a known contact type charger that includes an electroconductive or semiconductive roller, brush, film, or a rubber blade, and a non-contact type charger using corona discharging such as corotron and scorotron.

Preferably, the charger is disposed in contact or non-contact with the latent electrostatic image bearer and applies a direct voltage and an alternating voltage superimposed thereon to the surface of the image bearer.

Moreover, the charger is preferably a charging roller disposed in the proximity of the image bearer via a gap tape to avoid a direct contact with the image bearer and applies a direct voltage and an alternating voltage superimposed thereon to the surface of the image bearer.

The irradiation is conducted by, for example, irradiating the surface of the latent electrostatic image bearer with the irradiator.

There is no particular limitation to the irradiator and it can be suitably selected to suit to a particular application as long as the irradiator can irradiate the surface of an image bearer charged with a charger according to image information.

Specific examples include, but are not limited to, a photocopying optical system, a rod lens array system, a laser optical system, and a liquid crystal shutter optical system.

A rear side irradiation system that irradiates the image bearer from the rear side thereof can be also employed.

Developing and Developing Device

In the developing, the latent electrostatic image is developed with the toner of the present disclosure or the developing agent to render the latent electrostatic image visible.

The developing device develops the latent electrostatic image with the toner of the present disclosure or the developing agent to render the latent electrostatic image visible.

The visible image is formed by, for example, developing the latent electrostatic image with the toner of the present disclosure or the developing agent with the developing device.

The developing device is not particularly limited and can be selected from the known developing devices that can conduct development with the development agent of the present disclosure or the developing agent. For example, a developing device that includes a developing unit accommodating the toner of the present disclosure or developing agent and applies the developing agent to the latent electrostatic image in a contact or non-contact manner is suitably usable. The developing unit preferably includes the toner accommodating unit of the present disclosure that is detachably attached to the developing unit.

The developing unit employs a dry or wet developing method. It can take a monochrome developing unit or a full color developing unit. One of the developing units includes a stirrer that charges the toner or the developing agent by abrading and stirring and a rotatable magnet roller.

In the developing unit, for example, the toner and the carrier are mixed and stirred to triboelectrically charge the toner due to the friction therebetween. The toner is held on the surface of the rotating magnet roller, forming a magnet brush like a filament.

Since the magnet roller is provided near the latent electrostatic image bearing member, some of the toner forming the magnet brush on the magnet roller's surface is electrically attracted to the surface of the latent electrostatic image bearing member.

As a result, the latent electrostatic image is developed with the toner and rendered visible as a toner image on the surface of the latent electrostatic image bearer.

It is preferable to apply an alternating electric field to move the toner to the surface of the latent electrostatic image bearer.

Transferring and Transfer Device

In the transferring, the visible image is transferred to a printing medium.

The transfer device transfers the visible image to a printing medium.

In the transferring mentioned above, the visible image mentioned above is transferred to a printing medium. Preferably, the visible image is primarily transferred to an intermediate transfer member and thereafter secondarily transferred to the printing medium. It is more preferable that, with a two-color toner, preferably a full color toner, the visible image is primarily transferred to an intermediate transfer member to form a complex transfer image and the complex transfer image is thereafter secondarily transferred to the printing medium.

The transferring is conducted by, for example, charging the latent electrostatic image bearer with a transfer charger of the transfer device.

The transfer device preferably includes a primary transfer device to transfer the visible image to an intermediate transfer member to form a complex transfer image and a secondary transfer device to transfer the complex transfer image to a printing medium.

The transfer device (the primary transfer device and the secondary transfer device) preferably includes at least a transfer unit that peel-off charges the visible image formed on the latent electrostatic image bearer toward the transfer medium.

One or more transfer devices can be provided.

Specific examples of the transfer unit include, but are not limited to, a corona transfer unit using corona discharging, a transfer belt, a transfer belt, a transfer roller, a pressure transfer roller and an adhesive transfer device.

The intermediate transfer member is not particularly limited and can be suitably selected from the known transfer members. One of the transfer members is a transfer belt.

The transfer member is not particularly limited and can be suitably selected from the known printing media, typically printing paper.

Fixing and Fixing Device

In the fixing, the visible image transferred to a printing medium is fixed thereon. The fixing device fixes the visible image transferred to the printing medium.

Fixing can be conducted every time each color toner image is transferred to a printing medium. Alternatively, fixing can be conducted for a multi-color superimposed toner image.

There is no specific limit to the fixing device and it can be suitably selected to suit to a particular application. Using a known device that applies heating and pressure is preferable.

The fixing device includes: a combination of a heating roller and a pressure roller; a combination of a heating roller, a pressure roller, and an endless belt; and a fixing device including a heating member equipped with a heat-generating member, film in contact with the heating member, and a pressing member pressed against the heating member via the film, which fixes a non-fixed image with heat and pressure when a printing substrate with the non-fixed image thereon passes through between the film and the pressing member.

The heating temperature at the fixing device is preferably from 80 to 200 degrees C. In the present disclosure, for example, any known optical fixing device can be used in addition to or in place of the fixing device and the fixing depending on a particular application.

Other Processes and Other Devices

In the discharging, a discharging device applies a discharging bias to the latent electrostatic image bearer to remove the charge from the latent electrostatic image bearer.

The discharging device is not particularly limited as long as it can apply a discharging bias to the latent electrostatic image bearer. It can be selected among the known discharging devices. One example is a discharging lamp.

In the cleaning, the toner remaining on the surface of the latent electrostatic image bearer is removed, which can be suitably conducted by a cleaner.

As the cleaner, any known cleaner that can remove the toner remaining on the surface of the latent electrostatic image bearer is suitable. For example, a magnetic brush cleaner, an electrostatic brush cleaner, a magnetic roller cleaner, a blade cleaner, a brush cleaner, and a web cleaner are preferable.

In the recycling, the toner removed in the cleaning mentioned above is returned to the developing device for recycle use. This recycling can be suitably conducted with a recycling device.

The recycling device is not particularly limited. Any known conveying device can be used as the recycling device.

The controlling controls the processes mentioned above and can be suitably conducted with a controlling device.

The controlling device (controller) is not particularly limited and can be suitably selected to suit to a particular application as long as it can control the behavior of each device. Specific examples include, but are not limited to, a sequencer and a computer.

Other embodiments of the image forming method of the present disclosure are described with reference to FIG. 1.

FIG. 1 is a diagram illustrating a color image forming apparatus 100 employing a tandem system. The image forming apparatus 100 includes a photocopying unit 150, a sheet feeding table 200, a scanner 300, and an automatic document feeder (ADF) 400.

The photocopying unit 150 of the image forming apparatus has an intermediate transfer member 50 with an endless belt at the center thereof.

Figure 2:
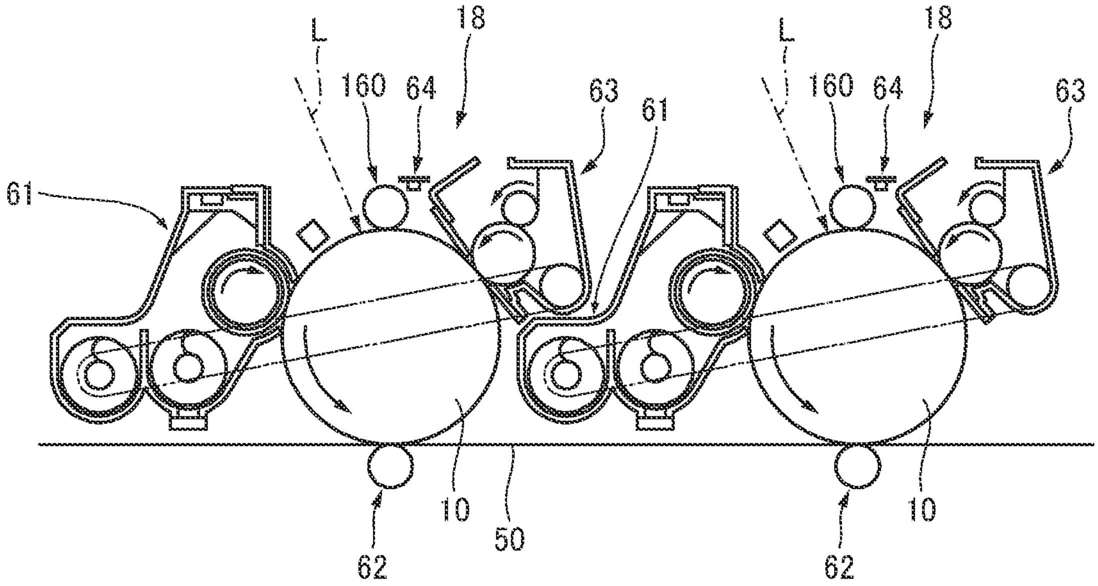
FIG. 2 is a partially enlarged diagram illustrating the diagram illustrated in FIG. 1.

The intermediate transfer member 50 is stretched over a support rollers 14, 15 and 16 and rotatable clockwise in FIG. 2.

An intermediate transfer member cleaner 17 is disposed around the support roller 15 to remove residual toner on the intermediate transfer member 50.

An image forming device 120 with four image forming units 18 of yellow, cyan, magenta, and black is disposed along the intermediate transfer member 50 stretched over the support rollers 14 and 15.

In addition, an irradiator 21 is disposed near the image forming device 120.

A secondary transfer device 22 and the image forming device 120 are disposed with the intermediate transfer member 50 therebetween.

In the secondary transfer device 22, a secondary transfer belt 24 having an endless form is stretched over a pair of rollers 23. A transfer medium transferred on the secondary transfer belt 24 can be brought into contact with the intermediate transfer member 50.

A fixing device 25 is disposed near the secondary transfer device 22.

The fixing device 25 includes a fixing belt 26 having an endless form and a pressure roller 27 pressed against the fixing belt 26.

In addition, in a tandem image forming apparatus 100, a sheet reverse device 28 for forming images on both sides of the printing medium by reversing the printing medium is disposed near the secondary transfer device 22 and the fixing device 25.

Next, how a full color image is formed with the image forming device 120 is described. First, a document (original) is set on a document table 130 in the automatic document feeder 400. Alternatively, the automatic document feeder 400 is opened to set an original on a contact glass 32 for the scanner 300, and then the automatic document feeder 400 is closed.

When the start button is pressed, the scanner 300 is immediately driven to scan the original on the contact glass 32 with a first scanning unit 33 and a second scanning unit 34 in the case where the original is set on the contact glass 32.

On the other hand, the scanner 300 is driven after the original is moved to the contact glass 32 in the case in which the original is set on the automatic document feeder 400.

Then the original is irradiated with light from the first scanning unit 33. The reflection light from the original is redirected at the mirror of the second scanning unit 34. The redirected light is received at a reading sensor 36 via an imaging forming lens 35 to read the color original to obtain image data information for black, yellow, magenta, and cyan.

Each image datum is transmitted to each image forming unit 18 in the image forming device 120 to form each visible image of black, yellow, magenta, and cyan.

Each image datum for black, yellow, magenta, and cyan is transmitted to each image forming unit 18 (image forming units for black, yellow, magenta, and cyan) in the image forming device 120 employing a tandem system to form each color toner image of black, yellow, magenta, and cyan at each image forming unit 18.

As illustrated in FIG. 2, each image forming unit 18 (image forming units for black, yellow, magenta and cyan) in the image forming device 120 includes a latent electrostatic image bearer 10 (a latent electrostatic image bearer 10K for black, a latent electrostatic image bearer 10Y for yellow, a latent electrostatic image bearer 10M for magenta, and a latent electrostatic image bearer 10C for cyan), a charger 160 that uniformly charges the latent electrostatic image bearer 10, an irradiator that irradiates the latent electrostatic image bearer 10 with beams of light L according to each color image datum to form a latent electrostatic image corresponding to each color image on the latent electrostatic image bearer 10, a developing unit 61 that forms a toner image with each color toner by developing each latent electrostatic image with each color toner (black toner, yellow toner, magenta toner, and cyan toner), a transfer charger 62 that transfers the toner image to the intermediate transfer member 50, a cleaner 63, and a discharging device 64. Therefore, each single color image (black image, yellow image, magenta image, and cyan image) can be formed based on each color image datum.

The black image, the yellow image, the magenta image, and the cyan image formed on the latent electrostatic image bearer 10K for black, the latent electrostatic image bearer bOY for yellow, the latent electrostatic image bearer 10M for magenta, and the latent electrostatic image bearer 10C for cyan, respectively, are primarily transferred sequentially to the intermediate transfer member 50 rotated by the support rollers 14, 15, and 16.

Then the black image, the yellow image, the magenta image, and the cyan image are superimposed on the intermediate transfer member 50 to form a synthetic color composite image (color transfer image).

In the sheet feeding table 200, one of the sheet feeding rollers 142 is selectively rotated to bring up printing media (sheets) from one of multiple sheet cassettes 144 stacked in a sheet bank 143. A separating roller 145 separates the printing media one by one to feed it to a sheet path 146. Transfer rollers 147 transfer and guide the printing medium to a sheet path 148 in the photocopying unit 150 of the image forming apparatus 100. Then the printing medium is held at a registration roller 49.

Alternatively, a sheet feeding roller 142 is rotated to bring up the printing media (sheets) on a bypass tray 54. The printing media are separated one by one with a separating roller 145, conveyed to a manual sheet path 53, and also halted at the registration roller 49.

The registration roller 49 is generally grounded but a bias can be applied thereto to remove paper dust on the printing medium.

The registration roller 49 is rotated in synchronization with the synthetic color composite image (color transfer image) on the intermediate transfer member 50 to feed the printing medium (sheet) between the intermediate transfer member 50 and the secondary transfer device 22. The synthetic color composite image is secondarily transferred to the printing medium (sheet) to form a color image thereon.

The residual toner remaining on the intermediate transfer member 50 after the image transfer is removed with the intermediate transfer member cleaner 17.

The printing medium to which the color image is transferred is sent to the fixing device 25 with the secondary transfer device 22. The synthetic color composite image is fixed on the printing medium with heat and pressure at the fixing device 25.

Thereafter, the printing medium is switched with a switching claw 55, then ejected outside with an ejection roller 56, and stacked on an ejection tray 57. Alternatively, the printing medium is switched with a switching claw 55, reversed with the sheet reverse device 28, and guided again to the transfer position. Then an image is formed on the reverse side. Thereafter, the printing medium is ejected with the ejection roller 56 and stacked on the ejection tray 57.

According to the image forming apparatus and the image forming method of the present disclosure, quality images can be produced over a long period of time with the toner with excellent flowability, high temperature storage stability, low temperature fixability, and printing durability.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is described in detail with reference to Examples but are not limited thereto.

In Examples, part means part by mass unless otherwise specified.

Manufacturing Example of Polyester Resin 1

The acid components and alcohol components shown in Table 1 were charged in a IL four-necked flask equipped with a thermometer, a stirrer, a condenser, and a nitrogen gas introducing tube. This flask was set on a mantle heater. Nitrogen gas was introduced into the flask through the nitrogen gas introducing tube. The temperature in the flask was raised while the inert gas atmosphere was kept inside the flask. Subsequently, 0.05 g of dibutyltin oxide was added to allow reaction at 200 degrees C. Polyester Resin 1 was thus obtained.

The properties of the Polyester Resin 1 are shown in Table 1.

In Table 1, the polycarboxylic acid component and the polyol component are represented in parts by mass. Mw refers to mass average molecular mass and the value of the peak top molecular weight means the molecular weight at the main peak value.

Manufacturing Example of Polyester Resin 2

The Polyester Resin 2 was obtained in the same manner as in Manufacturing Example of Polyester Resin 1 except that the type and the content in parts by mass of the polycarboxylic acid component and polyol component were changed as shown in Table 1.

The properties of the Polyester Resin 2 are shown in Table 1.

TABLE 1

| | | Polyester resin | |
|---|---|---|---|
| | | 1 | 2 |
| Polycarboxylic acid component | Terephthalic acid | 25 | 20 |
| | Fumaric acid | 30 | — |
| | Trimellitic acid | — | 30 |
| Polyol | Bisphenol A (2,2) propylene oxide | 25 | 15 |
| component | Bisphenol A (2,2) ethylene oxide | 20 | 35 |
| Property | Mw | 36000 | 40000 |
| | Peak top molecular weight | 13000 | 18000 |
| | Tg | 68 | 69 |

TABLE 1-continued

Example 1

Manufacturing of Mother Toner A

The mixture of the following recipe was stirred and mixed with a Henschel Mixer (FM20B, manufactured by Mitsui Miike Chemical Engineering Machinery) at 3,000 rotation per minute (rpm) for five minutes, followed by melt-kneading with a twin screw extruder (TEM-18SS, manufactured by Toshiba Machine) at 600 rpm and a barrel temperature of from 100 to 160 degrees C.

The kneaded matter obtained was subjected to rolling with a roller to have an average thickness of 1.7 mm, followed by cooling down to room temperature. The rolled matter was pulverized and classified with a Jet Mill (IDS-2, manufactured by Nippon Pneumatic Mfg. Co., Ltd.) and a rotor classifier (100TTSP, manufactured by Hosokawa Micron Corporation) to obtain Mother Toner A with a volume average particle diameter of 7.5 μm and an average circularity of 0.935.

Composition

- Polyester Resin 1: 50 parts
- Polyester Resin 2: 50 parts
- Carnauba wax (WA05TS, manufactured by TOA KASEI CO., LTD.): 3 parts
- Carbon black (MOGUL L, manufactured by Cabot Corporation): 10 parts
- Metal azo dye (T-77, manufactured by HODOGAYA CHEMICAL CO., LTD.): 1.8 parts Measuring of Average Circularity of Mother Toner The average circularity of the mother toner was measured in the following manner.

The specific procedure for obtaining the average circularity is as follows: 0.1 mL of an alkylbenzenesulfonic acid salt was added as a surfactant to 100 mL of water in a container from which solid impurities was preliminarily removed; 0.08 g of the mother toner particles as the measuring sample; the liquid suspension in which the mother toner particles were dispersed was subjected to ultrasonic dispersion for one minute twice to achieve a concentration of the particles of from 3,000 to 10,000 particles per microlitter; and the shape of the mother toner particles were measured to obtain their circularity using the instrument mentioned above.

Manufacturing of Toner

A total of one part of hydrophobized silica (H2000, manufactured by Wacker Chemie AG) and 0.5 parts of hydrophobized polymethylsilsesquioxane particles (SANSIL® MP-01, manufactured by Tokuyama Corporation) with an average particle diameter of 0.050 μm were added to 100 parts of the Mother Toner A followed by stirring and mixing with a Henschel Mixer to obtain Toner 1 of Example 1.

Manufacturing of Carrier 1

The mixture of the following composition was dispersed with a Homomixer for 10 minutes to prepare a liquid resin for forming a resin layer.

Composition

Liquid silicone resin: 2,100 parts

Toluene: 6,100 parts

Aminosilane: 30 parts

Carbon Black: 30 parts

The resin liquid was applied in an atmosphere at 60 degrees C. with a fluidized bed coater to the surface of ferrite particles (DFC-400M, manufactured by DOWA IP Creation Co., Ltd.) with a weight average particle diameter of 35 μm as the carrier core material followed by drying to achieve a thickness of 0.50 μm.

The thus-obtained carrier was left to rest in an electric furnace at 180 degrees C. for two hours followed by baking. Subsequent to cooling down, the resulting cooled matter was cracked with a sieve having an opening of 100 μm to obtain Carrier 1.

Manufacturing of Two Component Developing Agent

The Toner 1 and the Carrier 1 were uniformly mixed and charged with a TURBULA® mixer, manufactured by Willy A. Bachofen (WAB) AG, at 48 rpm for five minutes to manufacture Two-component Developing Agent 1 of Example 1.

The mixing ratio of the toner and the carrier was adjusted to the toner concentration of 4 percent by mass of the initial developing agent in the machine used for evaluation.

Example 2

Toner 2 and Developing Agent 2 of Example 2 were obtained in the same manner as in Example 1 except that the hydrophobized polymethylsilsesquioxane particles with an average particle diameter of 0.050 μm were changed to 1.0 part of hydrophobized polymethylsilsesquioxane particles (SANSIL® MP-01, manufactured by Tokuyama Corporation) with an average particle diameter of 0.085 μm

Example 3

Toner 3 and Developing Agent 3 of Example 3 were obtained in the same manner as in Example 1 except that the hydrophobized polymethylsilsesquioxane particles with an average particle diameter of 0.050 μm were changed to 1.5 parts of hydrophobized polymethylsilsesquioxane particles (SANSIL® MP-01, manufactured by Tokuyama Corporation) with an average particle diameter of 0.120 μm

Example 4

Toner 4 and Developing Agent 4 of Example 4 were obtained in the same manner as in Example 1 except that the hydrophobized polymethylsilsesquioxane particles with an average particle diameter of 0.050 μm were changed to 1.5 parts of hydrophobized polymethylsilsesquioxane particles (SANSIL® MP-01, manufactured by Tokuyama Corporation) with an average particle diameter of 0.150 μm

Example 5

Toner 5 and Developing Agent 5 of Example 5 were obtained in the same manner as in Example 3 except that 1 part of average particle diameter of 25 nm hydrophobic silica (NY50, manufactured by Nippon Aerosil Co., Ltd.) treated with silicon oil was added.

Example 6

Toner 6 and Developing Agent 6 of Example 6 were obtained in the same manner as in Example 3 except that the polymethylsilsesquioxane particle was changed from 1.5 to 4.0 parts.

Example 7

Toner 7 and Developing Agent 7 of Example 7 were obtained in the same manner as in Example 3 except that the Mother Toner A was changed to the Mother Toner B prepared in the following manner.

Manufacturing of Mother Toner B

The Mother Toner B was obtained in the same manner as in Manufacturing Mother Toner A except that carnauba wax was changed to rice wax (TOWAX-3F16, manufactured by TOA KASEI CO., LTD.). The Mother Toner B had an average circularity of 0.920.

Comparative Example 1

Toner 8 and Developing Agent 8 of Comparative Example 1 were obtained in the same manner as in Example 1 except that the hydrophobized polymethylsilsesquioxane particle was not added.

Comparative Example 2

Toner 9 and Developing Agent 9 of Comparative Example 2 were obtained in the same manner as in Example 5 except that the hydrophobized polymethylsilsesquioxane particle was not added.

Comparative Example 3

Toner 10 and Developing Agent 10 of Comparative Example 3 were obtained in the same manner as in Comparative Example 1 except that 1 part of hydrophobic silica (NY50, manufactured by Nippon Aerosil Co., Ltd.) with an average particle diameter of 120 nm treated with hexamethyl disilazane (HMDS) was added.

Comparative Example 4

Toner 11 and Developing Agent 11 of Comparative Example 4 were obtained in the same manner as in Example 1 except that the hydrophobized polymethylsilsesquioxane particles with an average particle diameter of 0.050 μm were changed to 1.5 parts of hydrophobized polymethylsilsesquioxane particles (SANSIL® MP-01, manufactured by Tokuyama Corporation) with an average particle diameter of 0.030 μm

Comparative Example 5

Toner 12 and Developing Agent 12 of Comparative Example 5 were obtained in the same manner as in Example 1 except that the hydrophobized polymethylsilsesquioxane particles with an average particle diameter of 0.050 μm were changed to 1.5 parts of hydrophobized polymethylsilsesquioxane particles (SANSIL® MP-01, manufactured by Tokuyama Corporation) with an average particle diameter of 0.20 km.

Comparative Example 6

Toner 13 and Developing Agent 13 of Comparative Example 6 were obtained in the same manner as in Example 3 except that the Mother Toner A was changed to the Mother Toner C prepared in the following manner.

Manufacturing of Mother Toner C

The Mother Toner C was obtained in the same manner as in Manufacturing Mother Toner A except that the Jet Mill was changed to a Turbo Mill (T250, manufactured by MATSUBO Corporation). The Mother Toner C had an average circularity of 0.955.

Comparative Example 7

Toner 14 and Developing Agent 14 of Comparative Example 7 were obtained in the same manner as in Example 3 except that the hydrophobized polymethylsilsesquioxane particles were changed to non-hydrophobized polymethylsilsesquioxane particles with an average particle diameter of 0.120 km.

Evaluation

The Toners and Developing Agents of Examples 1 to 7 and Comparative Examples 1 to 7 were subjected to the following evaluation.

The evaluation results are shown in Table 2.

Measuring of Average Particle Diameter of Polymethylsilsesquioxane

The average particle diameter of the polymethylsilsesquioxane particles was measured according to the following procedure.

Specifically, the toners were measured with a scanning electron microscope SU8200 series, manufactured by Hitachi High-Technologies Corporation.

The external additive was recognized by binarizing the image obtained utilizing an image processing software called “A-zou kun”, created by Asahi Kasei Engineering Corporation to calculate the circularity.

Arbitrary three field views of the toner’s surface were confirmed to calculate the equivalent circle diameter of about 100 particles. The average of the about 100 particles was determined as the average particle diameter.

Flowability of Toner

The toner’s flowability was determined according to the degree of toner aggregation. The degree of toner aggregation indicates the attachment force between toner particles. As the degree increases, the attachment force increases, which degrades the detaching in terms of developing.

The degree of toner aggregation was measured with a powder tester (manufactured by Hosokawa Micron Corporation) including three sieves each having an opening of 75 μm, 45 μm, and 22 μm disposed in this sequence from the top to the bottom. A total of 2 g of toner was placed on the sieve with an opening of 75 μm. The sieve was vibrated at an amplitude of 1 mm for 30 seconds. Thereafter the mass of the toner on each sieve was measured and multiplied by 0.5, 0.3, and 0.1. Each was added followed by calculating the percentage. The values obtained was evaluated according to the following criteria.

Evaluation Criteria

- A: Degree of toner aggregation was 15 percent or less
- B: Degree of toner aggregation was above 15 percent to 20 percent
- C: Degree of toner aggregation was above 20 percent High Temperature Storage Stability High temperature storage stability was measured with a penetrometer (manufactured by Nikka Engineering Co., Inc.)

Specifically, 10 g of each toner was weighed and placed in a glass container (30 ml screw vial) in an environment of 20 to 25 degrees C. and 40 to 60 percent relative humidity (RH). The lid of the container was then closed.

After the glass container containing the toner was tapped 100 times, the glass container was left in a thermostatic chamber set at 50 degrees C. for 24 hours. Thereafter, the penetration degree of the toner was measured with a penetrometer. The high temperature storage stability thereof was evaluated according to the following evaluation criteria.

The larger the penetration degree value, the more excellent the high temperature storage stability.

Evaluation Criteria

- S: Penetration degree was 30 mm or more
- A: Penetration degree was 25 mm to less than 30 mm
- B: Penetration degree was 20 mm to less than 25 mm
- C: Penetration degree was less than 20 mm Low Temperature Fixability TYPE 6200 paper, manufactured by Ricoh Co., Ltd., was set in a photocopier MF2200, manufactured by Ricoh Co., Ltd.) with a fixing device remodeled from its original fixing device with a TEFLON™ roller. Photocopying tests were conducted for each developing agent with the machine.

The cold offset temperature (minimum fixing temperature) was obtained by changing the fixing temperature.

The minimum fixing temperature was evaluated under the following conditions: linear speed of sheet feeding was from 120 to 150 mm/s, the surface pressure was 1.2 $Kgf/cm^2$, and the nipping width was 3 mm.

Evaluation Criteria

- A: The minimum fixing temperature was from 140 to lower than 150 degrees C.
- B: The minimum fixing temperature was from 150 to lower than 160 degrees C.
- C: the minimum fixing temperature is 160 degrees C. or higher mage Quality The produced images were totally evaluated regarding degradation of the image quality, specifically on poor transfer performance and poor cleaning of image bearer, after paper passing.

Images were produced with a procured image forming apparatus (manufactured by Ricoh Co., Ltd.) using each developing agent with a run length of 1,000 sheets. The output image was a 2 cm band in the portrait direction on an A4 landscape sheet. Subsequent to passing a black solid image in the image forming apparatus, the degree of transfer of the image was visually graded to evaluate the transfer performance.

Regarding cleaning an image bearer, images of 2 cm band in the portrait direction were produced on 1,000 A4 landscape sheets. Thereafter, the image forming apparatus was halted in developing a black solid image. The toner on the image bearer after cleaning with the cleaning unit was transferred to white paper with a Scotch tape followed by measuring with a spectrophotometer (X-Rite 938).

The same Scotch tape alone was attached to white paper followed by measuring with the spectrophotometer. The image density (TD) of the tape plus white paper was subtracted from the TD of the toner plus tape and white paper to obtain the difference for evaluating the cleaning performance on the image bearer.

The smaller the difference, the better the cleaning performance.

The image quality was evaluated according to the following evaluation criteria.

Evaluation Criteria

A: No defective image

B: Slight poor transfer performance decreases the image density and slight poor cleaning performance causes image fouling, without causing a practical problem C: Poor transfer performance decreases the image density and deficiency and poor cleaning performance causes image fouling

TABLE 2

| | | | Example 1 | Example 2 | Example 3 | Example 4 | Example 5 | Example 6 | Example 7 |
|---|---|---|---|---|---|---|---|---|---|
| | Toner No. | | 1 | 2 | 3 | 4 | 5 | 6 | 7 |
| Average particle diameter in right column | Hydrophobized polymethyl-silsesquioxane particle | 0.030 µm | | | | | | | |
| | | 0.050 µm | 0.5 | | | | | | |
| | | 0.085 µm | | 1.0 | | | | | |
| | | 0.120 µm | | | 1.5 | | 1.5 | 4.0 | 1.5 |
| | | 0.150 µm | | | | 1.5 | | | |
| | | 0.200 µm | | | | | | | |
| External additive | HMDS-treated hydrophobic silica | 12 nm | 1.0 | 1.0 | 1.0 | 1.0 | 1.0 | 1.0 | 1.0 |
| | | 120 nm | | | | | | | |
| | Silicone oil-treated hydrophobic silica | 25 nm | | | | | 1.0 | 1.0 | |
| | Non-hydrophobized polymethyl-silsesquioxane particle | 0.120 µm | | | | | | | |
| Mother toner | Mother toner A (average circularity of 0.935) | | Y | Y | Y | Y | Y | Y | |
| | Mother toner B (average circularity of 0.920) | | | | | | | | Y |
| | Mother toner C (average circularity of 0.955) | | | | | | | | |

TABLE 3

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| | Toner No. | | 8 | 9 | 10 | 11 | 12 | 13 | 14 |
| Average particle diameter in right column | Hydrophobized polymethyl-silsesquioxane particle | 0.030 µm | | | | 1.5 | | | |
| | | 0.050 µm | | | | | | | |
| | | 0.085 µm | | | | | | | |
| | | 0.120 µm | | | | | | 1.5 | |
| | | 0.150 µm | | | | | | | |
| | | 0.200 µm | | | | | 1.5 | | |
| External additive | HMDS-treated hydrophobic silica | 12 nm | 1.0 | 1.0 | 1.0 | 1.0 | 1.0 | 1.0 | 1.0 |
| | | 120 nm | | | 1.0 | | | | |
| | Silicone oil-treated hydrophobic silica | 25 nm | | 1.0 | | | | | |
| | Non-hydrophobized polymethyl-silsesquioxane particle | 0.120 µm | | | | | | | 1.0 |
| Mother toner | Mother toner A (average circularity of 0.935) | | Y | Y | Y | Y | Y | | Y |
| | Mother toner B (average circularity of 0.920) | | | | | | | | |
| | Mother toner C (average circularity of 0.955) | | | | | | | Y | |

TABLE 4

| | Toner | Developing agent | Toner Flowability | High temperature storage stability | Low temperature fixability | Image quality |
|---|---|---|---|---|---|---|
| Example 1 | 1 | 1 | A | B | A | A |
| Example 2 | 2 | 2 | A | A | A | A |
| Example 3 | 3 | 3 | A | A | A | A |
| Example 4 | 4 | 4 | A | A | A | S |
| Example 5 | 4 | 5 | A | S | A | S |
| Example 6 | 6 | 6 | A | S | B | B |
| Example 7 | 7 | 7 | A | A | A | A |
| Comparative Example 1 | 8 | 8 | C | C | A | B |
| Comparative Example 2 | 9 | 9 | B | A | A | C |

TABLE 4-continued

| | Toner | Developing agent | Toner Flowability | High temperature storage stability | Low temperature fixability | Image quality |
|---|---|---|---|---|---|---|
| Comparative Example 3 | 10 | 10 | A | A | C | A |
| Comparative Example 4 | 11 | 11 | A | C | A | B |
| Comparative Example 5 | 12 | 12 | A | S | B | C |
| Comparative Example 6 | 13 | 13 | A | A | B | C |
| Comparative Example 7 | 14 | 14 | B | A | A | C |

Aspects of the present disclosure are, for example, as follows.

1. A toner contains mother toner particles each containing a binder resin, a releasing agent, and a charge control agent, and an external additive containing hydrophobized polymethylsilsesquioxane particles with an average particle diameter of from 0.050 to 0.150 μm, wherein the mother toner particles have an average circularity of 0.95 or less.
2. The toner according to the 1 mentioned above, wherein the proportion of the hydrophobized polymethylsilsesquioxane particles is from 0.05 to 3 parts by mass to 100 parts by mass of the toner.
3. A toner accommodating unit containing the toner of the 1 or 2 mentioned above.
4. An image forming apparatus includes a latent electrostatic image bearer, a latent electrostatic image forming device for forming a latent electrostatic image on the latent electrostatic image bearer, a developing device for developing the latent electrostatic image formed on the latent electrostatic image bearer with the toner of the 1 or 2 mentioned above to obtain a visible image, a transfer device for transferring the visible image onto a transfer medium, and a fixing device for fixing the visible image transferred to the transfer medium.
5. An image forming method includes forming a latent electrostatic image on a latent electrostatic image bearer, developing the latent electrostatic image formed on the latent electrostatic image bearer with the toner of the 1 or 2 mentioned above to obtain a visible image, transferring the visible image formed on the latent electrostatic image bearer to a transfer medium, and fixing the visible image on the transfer medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A toner comprising:

mother toner particles each comprising:

a binder resin;

a releasing agent; and a charge control agent; and an external additive comprising hydrophobized polymethylsilsesquioxane particles with an average particle diameter of from 0.100 to 0.150 μm, wherein the mother toner particles have an average circularity of 0.95 or less.

2. The toner according to claim 1, wherein a proportion of the hydrophobized polymethylsilsesquioxane particles is from 0.05 to 3 parts by mass to 100 parts by mass of the toner.

3. A toner accommodating unit containing the toner of claim 1.

4. An image forming apparatus comprising:

a latent electrostatic image bearer;

a latent electrostatic image forming device configured to form a latent electrostatic image on the latent electrostatic image bearer;

a developing device configured to develop the latent electrostatic image formed on the latent electrostatic image bearer with the toner of claim 1 to obtain a visible image;

a transfer device configured to transfer the visible image onto a transfer medium; and a fixing device configured to fix the visible image transferred to the transfer medium.

5. An image forming method comprising:

forming a latent electrostatic image on a latent electrostatic image bearer;

developing the latent electrostatic image formed on the latent electrostatic image bearer with the toner of claim 1 to obtain a visible image;

transferring the visible image formed on the latent electrostatic image bearer to a transfer medium; and fixing the visible image on the transfer medium.

6. The toner according to claim 1, wherein the mother toner particles have an average circularity of 0.890 to 0.945.

7. The toner particle according to claim 1, wherein the charge control agent comprises an azo iron dye.

8. A two-component developing agent comprising a mixture of the toner according to claim 1 and a carrier.

9. The toner particle according to claim 1, wherein the binder resin comprises a polyester resin.

10. The toner particle according to claim 9, wherein the number of parts of the polyester resin is 50 to 95 parts by mass to 100 parts by mass of the mother toner particles.

11. The toner particle according to claim 1, wherein the releasing agent comprises a wax.

12. The toner particle according to claim 11, comprising 1 to 20 parts by mass of the wax to 100 parts by mass of the toner.

13. The toner particle according to claim 1, comprising 0.5 to 3 parts by mass of the charge control agent to 100 parts by mass of the binder resin.

14. The toner particle according to claim 7, comprising 0.05 to 3 parts by mass of hydrophobized polymethylsilsesquioxane particles to 100 parts by mass of the toner.

15. The toner particle according to claim 9, wherein the charge control agent comprises an azo iron dye.

16. The toner particle according to claim 15, wherein the releasing agent comprises a wax.

17. The toner particle according to claim 15, wherein the wax comprises carnauba wax.

18. A toner according to claim 1, wherein the hydrophobized polymethylsilsesquioxane particles have an average particle diameter of from 0.120 to 0.150 μm.

19. The toner particle according to claim 18, wherein the binder resin comprises a polyester resin and wherein the releasing agent comprises carnauba wax and wherein the charge control agent comprises a metal azo dye.

20. The toner particle according to claim 19, wherein polyester resin is formed from terephthalic acid, and fumaric or trimellitic acid, and bisphenol A propylene oxide and bisphenol A ethylene oxide.

* * * * *